United States Patent [19]

Bielinski et al.

[11] Patent Number: 5,606,889

[45] Date of Patent: Mar. 4, 1997

[54] REUSABLE INITIATOR FOR USE IN TRIGGERING HIGH-LOAD ACTUATORS

[75] Inventors: Slawomir J. Bielinski; Larry L. McCormick, both of Camarillo; Roger C. Stephenson, Woodland Hills, all of Calif.

[73] Assignee: G & H Technology, Inc., Camarillo, Calif.

[21] Appl. No.: 530,064

[22] Filed: Sep. 19, 1995

[51] Int. Cl.[6] .................................................. G05G 17/00
[52] U.S. Cl. ........................ 74/2; 137/76; 337/1; 403/2; 403/28
[58] Field of Search ......................... 74/2; 137/76; 337/1, 337/4; 403/2, 28

[56] References Cited

U.S. PATENT DOCUMENTS

| | | |
|---|---|---|
| 3,359,804 | 12/1967 | Phillips ................................ 74/2 |
| 3,924,688 | 12/1975 | Cooper et al. ...................... 337/1 X |
| 5,438,173 | 8/1995 | Rudoy et al. ....................... 337/1 X |
| 5,471,888 | 12/1995 | McCormick ......................... 74/2 |

*Primary Examiner*—Charles A. Marmor
*Assistant Examiner*—Troy E. Grabow
*Attorney, Agent, or Firm*—George J. Netter

[57] ABSTRACT

The initiator (32) has a hollow spool housing (34) with sidewall slots (42,44) and within which is received a shaft (54) to be releasably retained. Spool segments (46,48) are placed within slots (42,44) and have parts extending into the housing bore (50) obstructingly engaging the shaft (54) preventing its removal. A spring coil (82) wound over the spool segments (46,48) holds them in place. Cartridge assembly (62) is releasably secured to the housing (34) and includes a link wire (72) for securing one end of the coil (82). The link wire (72) is destructible by passing an electric current therethrough exceeding a certain value.

6 Claims, 1 Drawing Sheet

REUSABLE INITIATOR FOR USE IN TRIGGERING HIGH-LOAD ACTUATORS

BACKGROUND

1. Field of the Invention

The present invention relates generally to a device for cooperating with an actuator to initiate motion of a shaft or other object, and, more particularly, to such a device which is reusable.

2. Description of Related Art

A number of circumstances require the initiation of motion of a mechanical device of some kind (e.g., a shaft or object) in a precisely timed manner and reliably so that the shaft or object on moving accomplishes a given task. One well-known apparatus for accomplishing this restrains a spring-loaded member which it is desired to move and explosive means are utilized to sever or rupture the restraining means for rapidly and precisely releasing of the spring-loaded member. However, explosive means are not always applicable in view of the possibility of danger and destruction to surrounding equipment and personnel.

In U.S. Pat. No. 5,477,888 issued Dec. 5, 1995, Motion INITIATOR, by Larry L. McCormick, depicted in FIG. 1 herein, substantially semi-cylindrical spool halves 12 and 14 with configured interior walls are fitted together along with an insulative body 16 located between the two spool halves to surroundingly restrain a body or shaft 18 Which is subjected to a force urging movement of the body or shaft (e.g., spring). A restraining coil 20 is wound around the spool halves and insulative body securing them together as a unit with one end of the restraining wire being held by a link wire 24 that is mounted on the insulating body 16. Electrical actuation sends a current through the link wire causing it to break and allow the restraining wire to release the spool halves which, in turn, causes the object or shaft to be moved by virtue of its force loading. The insulative body with link wire after the link wire has been destroyed are then typically thrown away as are the spool halves themselves.

There are many situations in which a relatively large number of tests are run, for example, and in which initiating apparatus would be required for each test run. It is, therefore, a desideratum to have the initiating apparatus or parts thereof be constructed in a manner to permit reuse for the obvious reasons of cost and efficiency of operation.

SUMMARY OF THE INVENTION

A spool initiator with which the present invention can be most advantageously employed has multiple spool halves provided with internal configured walls enabling securement about an object or shaft to prevent reactive movement responsive to an applied force such as a spring, for example. A retainer wire having inherent spring tension is helically wound about the initiator spool halves holding them in place about the object and thereby securing the object against release responsive to the spring force. One end of the retainer wire is fixedly secured to a spool half and the other is held securely in place by a separate link wire. The link wire on being energized with a sufficiently high electrical current will have its physical strength substantially reduced and, in fact, reduced to the point that the tension which it is placed in by the restraining wire coil is sufficient to cause the link wire to break. On breakage, the retainer coil immediately unravels to a larger diameter releasing the spool halves and thus allowing the applied force to drive the object or shaft in the predetermined direction.

In the practice of the present invention the link wire is incorporated onto a separate cartridge member which is releasably mounted onto the outer surface of one of the spool halves by a bolt, for example. In use the link wire portion which extends outwardly from the cartridge is first hooked onto the one end of the restraining wire coil, the coil pulled tightly into securing relationship without exerting undue force on the link wire before or after which the cartridge is secured in position by its bolt.

The link member after being used for its purpose is then released from the spool halves by removing the bolt. The cartridge is then either replaced with a new cartridge or a new link wire is provided in the spent cartridge.

DESCRIPTION OF A PREFERRED EMBODIMENT

Figure 5:
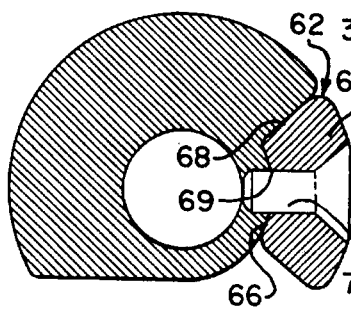
FIG. 5 is a further end elevational sectional view taken along the line 5—5 of FIG. 2.
Figure 6:
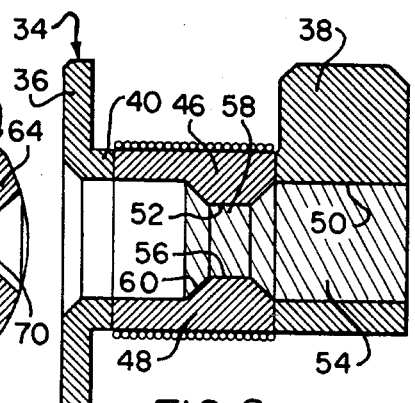
FIG. 6 is a side elevational sectional view taken along the line 6—6 of FIG. 3.

Turning now to FIGS. 2 through 6, the initiator of the present invention enumerated generally as 32 is seen to include an elongated spool housing 34 having an enlarged front or forward end flange 36 and a rear end radially outwardly extending flange portion 38. The two flanges are interconnected by a generally cylindrical hollow member 40 the side walls of which contain first and second elongated slots 42 and 44 (FIG. 4) extending longitudinally and generally parallel to one another. First and second spool segments 46 and 48 each have the general shape of a cylindrical segment and are so dimensioned as to be individually fittingly received within the slots 42 and 44, respectively. As can be seen best in FIG. 4 the outer surface of the connecting body 40 and the spool segments 46 and 48 when positioned within the slots form a smooth continuous circumferential surface. Moreover, as shown in FIG. 6 the interior of the spool housing bore 50 is circular and of uniform diameter whereas the two spool segments include inner walls which are spaced apart at 52 an amount less than the spool bore diameter for a purpose to be described.

With reference now particularly to FIG. 6, an object or shaft 54 having its movement controlled by the described initiator 32 has its external surface configured so as to be fittingly received within the housing spool bore 50. More particularly, shaft 54 has a slot 56 on its periphery for receiving inwardly directed portions 58 and 60 on the respective spool segments 46 and 48 when the segments are positioned within slots 42 and 44 of member 40. The portions 58 and 60 serve to trap the shaft 54 within the housing bore preventing its withdrawal.

A cartridge assembly 62 includes a body 64 of an electrically insulative material (e.g., ceramic) which has one surface 66 that conforms to a cutout portion 68 on the rear flange portion 38 (FIG. 5). An opening in the body 64 can be aligned with a threaded opening 69 in the flange portion 38 for receiving a threaded bolt 70 therein to secure the cartridge assembly to the flange portion 38.

A length of link wire 72 is generally embedded within body 64 with a loop 74 which extends outwardly away from the body and two end portions terminating externally in electrical leads 76 and 78. Although other materials may be found satisfactory to date, best results have been obtained with a link wire constructed of stainless steel.

A generally cylindrical ceramic spool 79 having an axial opening therethrough includes a continuous circumferentially extending groove 80 on its periphery. The link wire loop 74 is positioned within the groove 80.

A retaining wire helical coil 82 constructed of a wire having springlike characteristics is located on the member 40 and spool segments 46 and 48 (FIG. 6) which releasably locks the shaft 54 to the initiator. One end of the coil wire is formed into a loop 84 that is anchored to a pedestal 86 on flange 36. The opposite end portion of the coil wire passes through the opening in the spool 79 and the outer end is deformed to aid securement within the opening. The spool body insulates the link wire 72 against accidental short-circuiting with the retaining coil or other adjacent equipment.

Figure 1:
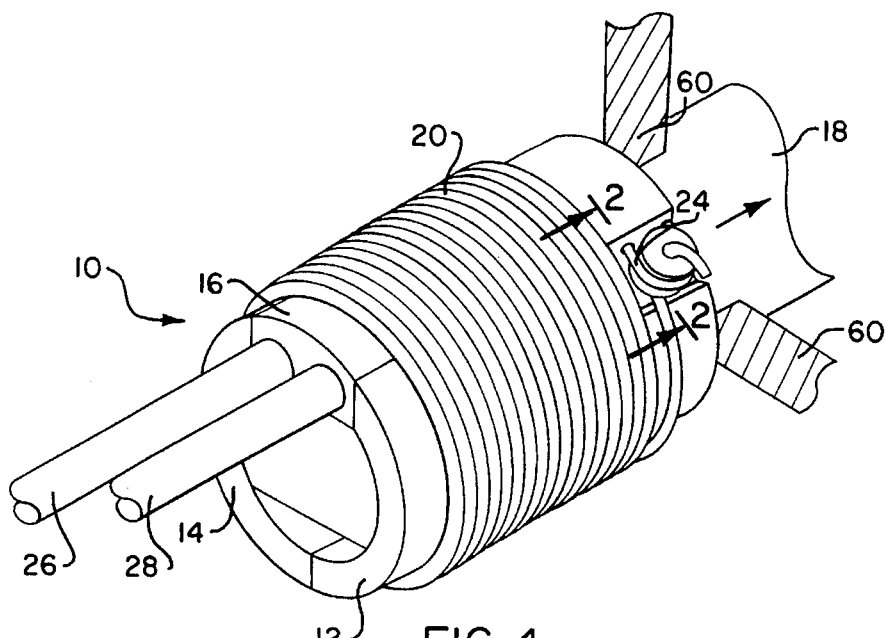
FIG. 1 is a perspective view of a prior art initiator as shown mounted onto a shaft to be secured against movement.
Figure 2:
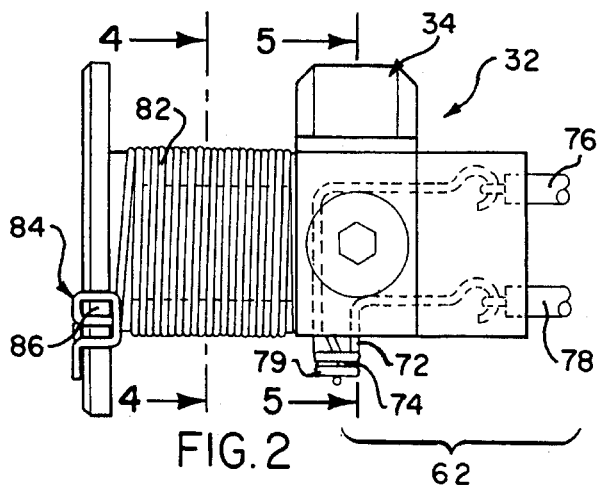
FIG. 2 is a side elevational view of an initiator of the present invention.
Figure 3:
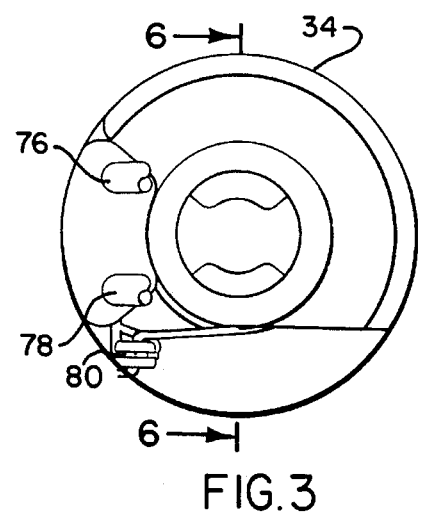
FIG. 3 is an end elevational view of the device of FIG. 2.
Figure 4:
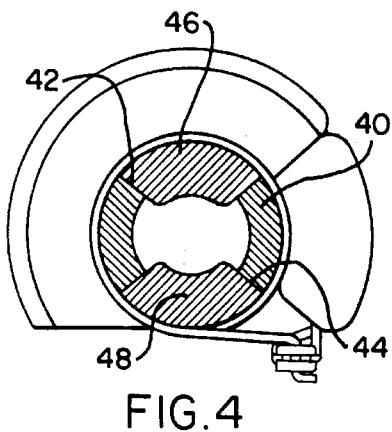
FIG. 4 is an end elevational sectional view taken along the line 4—4 of FIG. 2.

When it is desired to use the described initiator, first the housing spool 34 is slid onto the end of the shaft or object 54 with the slot 56 therein being positioned opposite the slots 42 and 44 as shown in FIG. 6. Next, the first and second spool segments 46 and 48 are positioned within the slots 42 and 44 so as to secure the shaft or object by means of the inwardly directed portions 58 and 60 (FIG. 6). The retaining coil 82 is then positioned as already described (FIGS. 2 and 6).

Upon applying a sufficient amount of electric current via leads 88 and 90, the link wire tensile strength is reduced sufficiently so that the tension exerted upon the link wire by the inherent spring-like force of the coil spring break the link wire. The coil is now released and due to its inherent spring nature it will assume a larger coil diameter which frees the spool segments and release the shaft 54. The shaft can now move in the direction of the arrow it is being urged by an external force (not shown). If it is desired to operate the apparatus once again, the used cartridge assembly 62 is dismounted from the housing by removing the bolt 70 and replacing with a new cartridge assembly.

Although the invention has been described in connection with a preferred embodiment, it is to be understood that those skilled in the appertaining art may affect changes which come within the spirit of the invention and the ambit of the appended claims.

What is claimed is:

1. Apparatus for initiating motion of an object subjected to a force, comprising:

spool housing means having a bore of sufficient dimensions for the object to be slidingly received therein, and an opening extending between the bore and the exterior;

spool segment means releasably fitting into the housing means opening with parts extending into the bore for obstructingly engaging the object;

a coil of spring wire received about the spool segment means, one end of the wire being secured to the spool housing means; and cartridge means releasably mounted to the housing by a bolt the cartridge means including an insulative body, a link wire secured to said insulative body with a loop extending outwardly of said body, and an insulative spool with a central opening through which the other end of the coil wire is lockingly engaged and to which the link wire is secured;

on breakage of the link wire the coil assumes a larger helical diameter releasing the segment means and the object.

2. Apparatus as in claim 1, in which the cartridge means insulative spool includes an outwardly facing peripheral groove within which the link loop is located.

3. Apparatus as in claim 1, in which the one end of the wire coil is formed into a loop that is secured to a pedestal on the housing means.

4. Apparatus as in claim 1, in which the cartridge means insulative body is constructed of a ceramic material.

5. Apparatus as in claim 1, in which the link wire is constructed of stainless steel.

6. Apparatus for initiating motion of an object subjected to a force, comprising:

spool housing means with a bore of sufficient dimensions for receiving the object slidingly therein, and including an opening extending between the bore and the exterior;

spool segment means releasably fitting into the housing means opening with parts extending into the bore for obstructingly engaging the object;

a coil of spring wire compressingly received about the spool segment means, one end of the wire being secured to the spool housing means; and cartridge means mounted to the housing means outwardly of the coil of spring wire and free from compression from the coil of spring wire, the cartridge means, including an insulative body, a link wire secured to said insulative body with a loop extending outwardly of said body, and an insulative spool to which the link wire is secured, said spool having a central opening through which the other end of the spring wire coil is lockingly engaged;

on breakage of the link wire the coil assumes a larger helical diameter releasing the segment means and the object.

\* \* \* \* \*